(12) United States Patent
Matsumoto et al.

(10) Patent No.: US 12,024,186 B2
(45) Date of Patent: Jul. 2, 2024

(54) ELECTRONIC APPARATUS, INPUT LOCKING CONTROL METHOD, AND INPUT LOCKING CONTROL PROGRAM

(71) Applicant: JVCKENWOOD Corporation, Yokohama (JP)

(72) Inventors: Masaki Matsumoto, Yokohama (JP); Morihiro Sato, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 503 days.

(21) Appl. No.: 17/333,542

(22) Filed: May 28, 2021

(65) Prior Publication Data

US 2021/0284188 A1 Sep. 16, 2021

Related U.S. Application Data

(63) Continuation of application No. PCT/JP2019/032313, filed on Aug. 19, 2019.

(30) Foreign Application Priority Data

Nov. 30, 2018 (JP) ................................ 2018-224551

(51) Int. Cl.
  *B60J 5/10* (2006.01)
  *B60W 50/10* (2012.01)
(52) U.S. Cl.
  CPC ............... *B60W 50/10* (2013.01); *B60J 5/10* (2013.01)
(58) Field of Classification Search
  None
  See application file for complete search history.

(56) References Cited

U.S. PATENT DOCUMENTS

| 5,563,483 | A * | 10/1996 | Kowall | E05B 81/14 318/266 |
| 8,224,532 | B2 * | 7/2012 | Schmitt | E05F 15/40 701/45 |
| 8,245,447 | B2 * | 8/2012 | Oh | E05C 17/60 49/164 |
| 8,564,227 | B2 * | 10/2013 | Stoger | H02H 7/0851 318/434 |
| 9,511,651 | B2 * | 12/2016 | Shibata | E05F 15/695 |
| 10,239,489 | B2 * | 3/2019 | Liubakka | B60R 25/23 |

(Continued)

FOREIGN PATENT DOCUMENTS

| JP | 2001-109563 A | 4/2001 |
| JP | 2010-168817 A | 8/2010 |
| JP | 2017-213987 A | 12/2017 |

*Primary Examiner* — Jonathan M Dager
(74) *Attorney, Agent, or Firm* — Procopio, Cory, Hargreaves & Savitch LLP (57) ABSTRACT

An electronic apparatus is installed in a vehicle which is an example of a moving body. The electronic apparatus includes a manual operation unit configured to receive an input, a control unit configured to perform control according to the input received by the manual operation unit, and an opening/closing-information acquisition unit configured to acquire opening/closing information of an opening/closing part of a vehicle. When the opening/closing information acquired by the opening/closing-information acquisition unit indicates that the opening/closing part is in a closed state, the control unit disables the input received by the manual operation unit.

4 Claims, 9 Drawing Sheets

(56) References Cited

U.S. PATENT DOCUMENTS

| | | | |
|---|---|---|---|
| 10,378,265 B2* | 8/2019 | Watanabe | E05B 83/18 |
| 10,767,411 B2* | 9/2020 | Tensing | E05F 15/611 |
| 11,247,635 B1* | 2/2022 | Salter | B60R 25/24 |
| 2002/0180269 A1* | 12/2002 | Dalakuras | E05F 15/41 |
| | | | 307/9.1 |
| 2004/0090083 A1* | 5/2004 | Greuel | G05B 19/416 |
| | | | 296/146.4 |
| 2004/0119433 A1* | 6/2004 | Tanoi | B60J 7/0573 |
| | | | 318/469 |
| 2004/0124662 A1* | 7/2004 | Cleland | E05F 1/1091 |
| | | | 296/146.4 |
| 2005/0073852 A1 | 4/2005 | Ward | |
| 2005/0168010 A1* | 8/2005 | Cleland | E05F 15/41 |
| | | | 296/146.8 |
| 2005/0269833 A1* | 12/2005 | Park | E05F 1/1091 |
| | | | 296/146.8 |
| 2006/0181108 A1* | 8/2006 | Cleland | E05F 15/43 |
| | | | 296/146.4 |
| 2006/0181152 A1* | 8/2006 | Taurasi | B60R 25/00 |
| | | | 307/10.2 |
| 2013/0024076 A1* | 1/2013 | Fukui | E05F 15/622 |
| | | | 701/49 |
| 2013/0340341 A1* | 12/2013 | Shibata | E05F 15/40 |
| | | | 49/31 |
| 2015/0033630 A1* | 2/2015 | Oakley | E04F 15/02 |
| | | | 49/31 |
| 2015/0284983 A1* | 10/2015 | Conner | E05F 1/10 |
| | | | 318/3 |
| 2016/0002969 A1* | 1/2016 | Ogawa | E05F 15/695 |
| | | | 318/280 |
| 2016/0222711 A1* | 8/2016 | Aoshima | E05F 15/41 |
| 2017/0159347 A1* | 6/2017 | Mayr | B60P 1/4414 |
| 2017/0342762 A1 | 11/2017 | Iino et al. | |
| 2019/0278466 A1* | 9/2019 | Raats | B60K 35/10 |
| 2020/0148283 A1* | 5/2020 | Robinson | B62D 33/03 |
| 2020/0378170 A1* | 12/2020 | Kerr | E05F 15/63 |
| 2023/0017327 A1* | 1/2023 | Weston | B60W 40/12 |

* cited by examiner

ELECTRONIC APPARATUS, INPUT LOCKING CONTROL METHOD, AND INPUT LOCKING CONTROL PROGRAM

CROSS REFERENCE TO RELATED APPLICATION

This application is a Bypass Continuation of PCT/JP2019/032313, filed on Aug. 19, 2019, which is based upon and claims the benefit of priority from Japanese patent application No. 2018-224551, filed on Nov. 30, 2018, the disclosure of which is incorporated herein in its entirety by reference.

BACKGROUND

The present invention relates to an electronic apparatus, its input locking control method, and its input locking control program, and in particular to an electronic apparatus installed in a moving body, its input locking control method, and its input locking control program.

There is a locking method by which, when a predetermined input operation state occurs in an electronic apparatus, the subsequent new input operations for the electronic apparatus are disabled. Japanese Unexamined Patent Application Publication No. 2001-109563 discloses such a locking method for an input apparatus. In the locking method disclosed in Japanese Unexamined Patent Application Publication No. 2001-109563, for example, when a key is continuously pressed for a duration longer than a predetermined time, it is determined that the input apparatus is in an abnormal input operation state, so that the subsequent new input operations are disabled.

Regarding the conventional locking method for an electronic apparatus, there are cases in which when an electronic apparatus is installed in a moving body such as a vehicle or a ship and an opening/closing part of the moving body is closed, an operation unit of the electronic apparatus is accidentally sandwiched between the opening/closing part and baggage or the like carried in the moving body. As a result, the operation unit of the electronic apparatus may come into contact with the baggage or the like and hence the operation unit may receive an operation input that is not intended by the user, so that the electronic apparatus may malfunction.

SUMMARY

An electronic apparatus according to an embodiment is an electronic apparatus installed in a moving body, including:
 a manual operation unit configured to receive an input for operating the electronic apparatus;
 a control unit configured to perform control according to the input received by the manual operation unit; and
 an opening/closing-information acquisition unit configured to acquire opening/closing information of an opening/closing part of the moving body, in which
 when the opening/closing information acquired by the opening/closing-information acquisition unit indicates that the opening/closing part is in a closed state, the control unit disables the input received by the manual operation unit.

An input locking control method for an electronic apparatus according to an embodiment includes:
 a step of acquiring opening/closing information of an opening/closing part of a moving body; and
 a step of disabling an input received by a manual operation unit of the electronic apparatus when the acquired opening/closing information indicates that the opening/closing part is in a closed state.

An input locking control program for an electronic apparatus according to an embodiment causes the electronic apparatus to perform:
 a step of acquiring opening/closing information of an opening/closing part of a moving body; and
 a step of disabling an input received by a manual operation unit of the electronic apparatus when the acquired opening/closing information indicates that the opening/closing part is in a closed state.

DETAILED DESCRIPTION

First Embodiment

Figure 1:
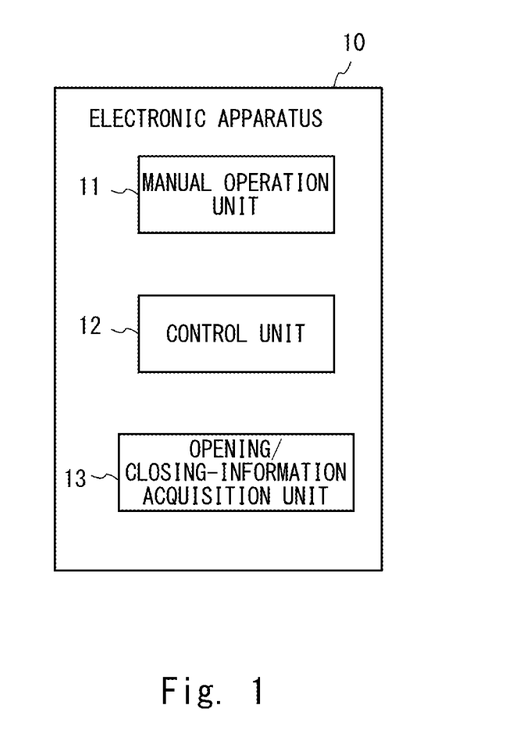
FIG. 1 is a block diagram showing an example of a configuration of an electronic apparatus according to a first embodiment.
Figure 2:
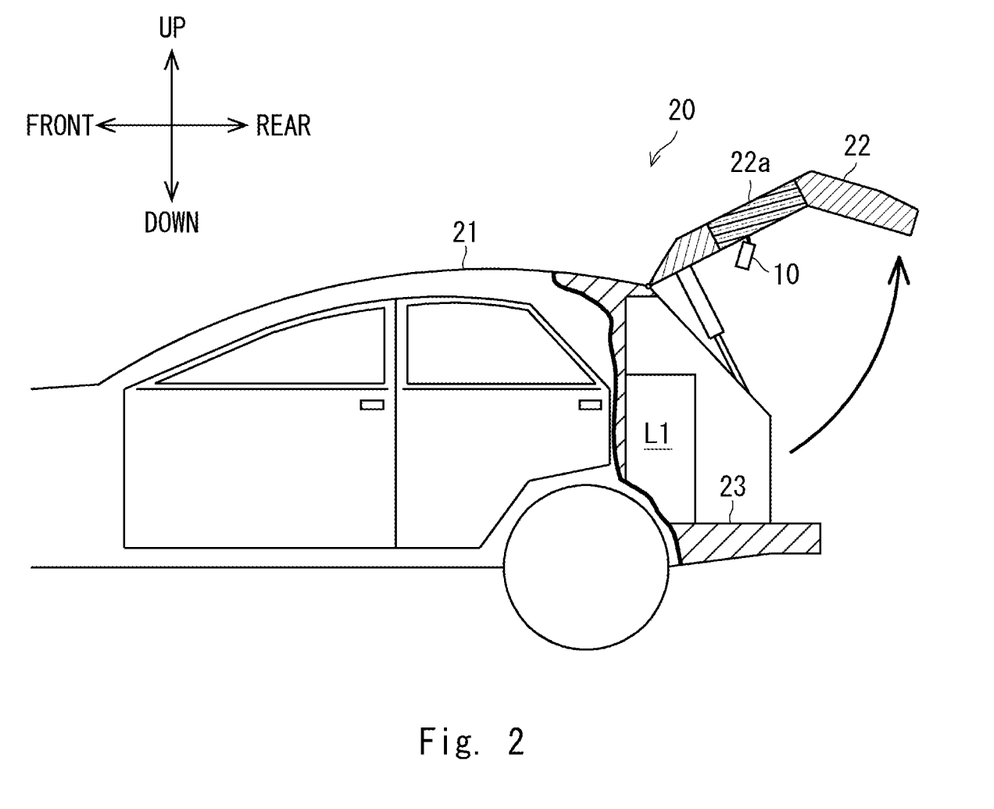
FIG. 2 is a partially cut-out sectional view showing how to use an example to which the electronic apparatus according to the first embodiment is applied.
Figure 3:
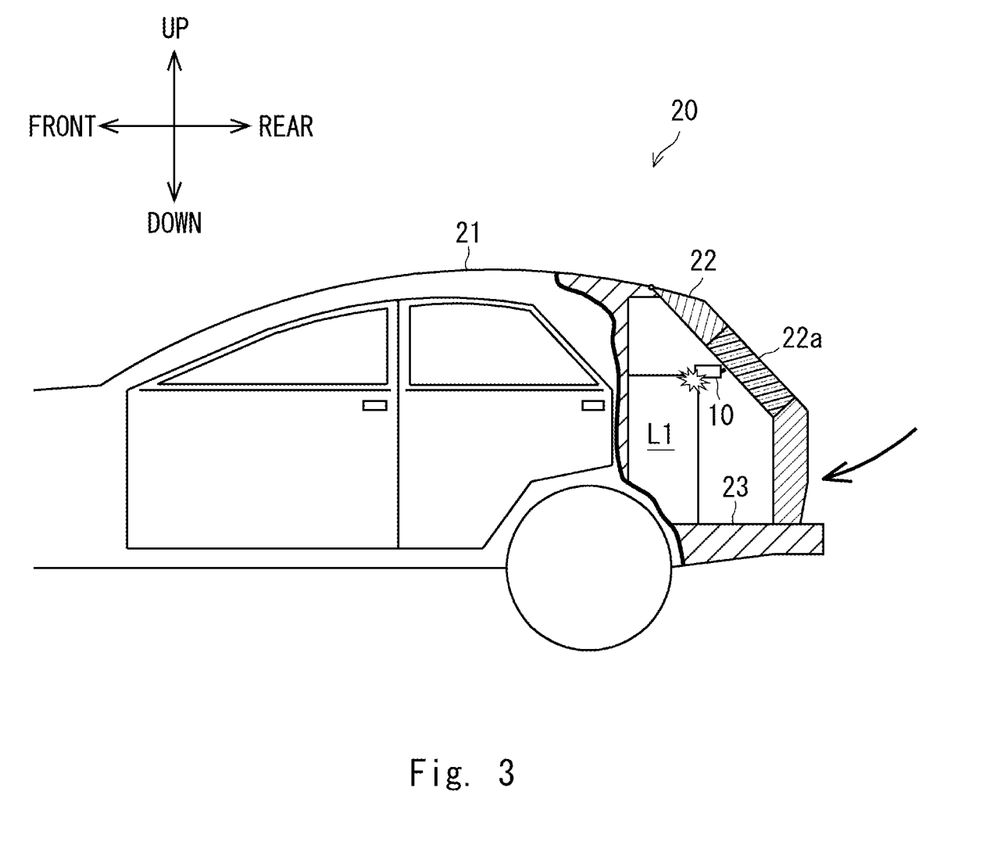
FIG. 3 is a partially cut-out sectional view showing how to use the example to which the electronic apparatus according to the first embodiment is applied.

A first embodiment will be described hereinafter with reference to FIGS. 1 to 3. FIG. 1 is a block diagram showing an example of a configuration of an electronic apparatus according to the first embodiment. FIGS. 2 and 3 are partially cut-out sectional views showing how to use an example to which the electronic apparatus according to the first embodiment is applied.

As shown in FIG. 1, the electronic apparatus 10 includes a manual operation unit 11, a control unit 12, and an opening/closing-information acquisition unit 13. The example of the electronic apparatus 10 shown in FIG. 1 further includes, inside the opening/closing-information acquisition unit 13, an opening/closing-part inclination-level detection unit 14 (not shown), an electronic-apparatus inclination-level detection unit (not shown), or an imaging-unit inclination-level detection unit (not shown). In this embodiment, the electronic apparatus 10 is installed in a vehicle, which is shown as a vehicle 20 in FIGS. 2 and 3. The electronic apparatus 10 may be installed in or near an opening/closing part of the vehicle. Alternatively, the electronic apparatus 10 may be installed in a moving body such as a ship or a train. That is, there is no particular restriction on the place where the electronic apparatus 10 is installed. An example of the opening/closing part is an opening/closing part 22 of the vehicle 20, i.e., a tailgate of the vehicle 20. Note that the electronic apparatus 10 may further include an imaging unit (not shown), and may be, for example, a dashboard camera.

The manual operation unit 11 receives a manual input manually entered by a user and generates an input signal therefrom. The user can operate the electronic apparatus 10 through inputs to the manual operation unit 11 provided on the surface of the housing of the electronic apparatus 10. Specifically, the manual operation unit 11 includes keys and buttons, and generates an input signal as the user presses or touches a key or a button with his/her hand or the like. The manual operation unit 11 outputs the generated input signal to the control unit 12. The manual operation unit 11 is disposed, for example, on the surface of the housing of the electronic apparatus 10, and in or near the opening/closing part exemplified by the opening/closing part 22 shown in FIGS. 2 and 3. Further, the manual operation unit 11 may include a touch panel.

The control unit 12 can be formed by a processor such as a CPU (Central Processing Unit). That is, the control unit 12 can have a function as a computer. The control unit 12 can perform various types of processing by executing a program(s) stored in a storage device. Further, by performing the program(s), the control unit 12 implements the functions of components for performing the necessary operations as the manual operation unit 11, the opening/closing-information acquisition unit 13, and the electronic apparatus 10. The control unit 12 disables (locks) or enables (unlocks) an input received by the manual operation unit 11 based on opening/closing information acquired by the opening/closing-information acquisition unit 13.

The storage device may include, for example, a DDR (Double Data Rate) memory, a Flash memory, and a microcomputer as a part of the control unit 12 or outside the control unit 12. Further, the electronic apparatus 10 may include an EEPROM (Electrically Erasable and Programmable Read Only Memory) as a part of the control unit 12 or outside the control unit 12.

Note that each of the components of the electronic apparatus 10 is not limited to those implemented by a program(s), but may be one that is implemented by hardware, a combination of hardware and a program, or the like. Further, each of the components of the electronic apparatus 10 may be implemented by using an integrated circuit that a user can program, such as an FPGA (Field-Programmable Gate Array) and a microcomputer. In this way, the electronic apparatus 10 may implement the function of each of the components of the electronic apparatus 10 by using the integrated circuit.

The opening/closing-information acquisition unit 13 acquires opening/closing information of the opening/closing part for determining whether the opening/closing part is opened or closed, or various types of detection information by which opening/closing information can be formed. The opening/closing-information acquisition unit 13 may acquire opening/closing information of the opening/closing part of the vehicle, for example, through a CAN (Controller Area Network), or may acquire detection information from various sensors such as a contact sensor and a range sensor. Further, the opening/closing-information acquisition unit 13 may derive opening/closing information by performing calculation using the obtained various types of information. The opening/closing-information acquisition unit 13 may include opening/closing-part inclination-level detection information indicating the degree of inclination of the opening/closing part of the vehicle with respect to the vehicle main-body.

The opening/closing-part inclination-level detection unit 14 detects opening/closing-part inclination-level detection information indicating the degree of inclination of the opening/closing part of the vehicle with respect to the vehicle main-body. As the opening/closing-part inclination-level detection unit 14, for example, a sensor such as an acceleration sensor or a gyroscopic sensor can be used. The acceleration sensor detects changes in accelerations in three-dimensional xyz-axis directions. Specifically, the opening/closing-part inclination-level detection unit 14 calculates and detects inclination-level detection information of the opening/closing part based on the changes in accelerations in the three-dimensional xyz-axis directions. The opening/closing-part inclination-level detection unit 14 is disposed, for example, in the electronic apparatus 10, or may be provided as a separate entity from the electronic apparatus 10. The opening/closing-part inclination-level detection unit 14 may be installed in or near the opening/closing part exemplified by the opening/closing part 22 shown in FIGS. 2 and 3. An electronic-apparatus inclination-level detection unit (not shown) detects opening/closing-part inclination-level detection information indicating the degree of inclination of the electronic apparatus 10 with respect to the vehicle main-body. Similarly to the opening/closing-part inclination-level detection unit 14, a sensor such as an acceleration sensor and a gyroscopic sensor can be used for the electronic-apparatus inclination-level detection unit.

(Input Locking Control Method 1)

An example of an input locking control method using the electronic apparatus 10 will be described hereinafter with reference to FIGS. 2 and 3. Note that although the electronic apparatus 10 is used in this example of the input locking control method, other types of electronic apparatuses or a part of the configuration thereof may be used.

As shown in FIG. 2, the example of the electronic apparatus 10 described here is installed in the vehicle 20. The vehicle 20 includes a vehicle main-body 21 and an opening/closing part 22. The example of the opening/closing part 22 shown in FIG. 2 is also referred to as a tailgate. An upper end of the opening/closing part 22 is rotatably connected to the vehicle main-body 21. Specifically, the upper end of the opening/closing part 22 is connected to the rear upper end of the vehicle main-body 21 through a hinge or the like. The opening/closing part 22 is attached to the vehicle main-body 21 in such a manner that as the connection part between the upper end of the opening/closing part 22 and the rear upper end of the vehicle main-body 21 is rotated, the lower side of the opening/closing part 22 moves close to the vehicle main-body 21 or moves away from the vehicle main-body 21. The opening/closing part 22 preferably includes a transparent part 22a. The transparent part 22a is made of, for example, glass or resin. The vehicle main-body 21 includes a luggage compartment 23. The luggage compartment 23 can contain luggage L1 having a predetermined size. The luggage compartment 23 can be opened or closed to the outside as the opening/closing part 22 is opened or closed. The electronic apparatus 10 is disposed, for example, in the transparent part 22a of the opening/closing part 22 of the vehicle 20, or in an area of the vehicle main-body 21 near the transparent part 22a.

Note that the opening/closing-information acquisition unit 13 shown in FIG. 1 acquires opening/closing information indicating whether the opening/closing part of the vehicle is in an opened state or a closed state. For example, the opening/closing-part inclination-level detection unit 14 may detect inclination-level detection information indicating the degree of inclination of the opening/closing part 22 of the vehicle 20 with respect to the vehicle main-body 21, and the opening/closing-information acquisition unit 13 may acquire this opening/closing-part inclination-level detection information and derive opening/closing information indicating whether the opening/closing part is in an opened state or a closed state. When the opening/closing information acquired by the opening/closing-information acquisition unit 13 indicates that the opening/closing part 22 is in the opened state, the control unit 12 performs control based on the opening/closing information so that an input entered to the manual operation unit 11 is enabled. Therefore, the manual operation unit 11 receives an input entered by a user, so that the electronic apparatus 10 is operated by the user.

On the other hand, when the opening/closing part 22 is in a closed state as shown in FIG. 3, in some cases, the electronic apparatus comes into contact with the luggage L1 placed in the luggage compartment 23. In the case where the manual operation unit 11 (see FIG. 1) of the electronic apparatus 10 is disposed on the FRONT side or the DOWN side of the surface of the housing of the electronic apparatus 10 shown in FIG. 3, there is a possibility that the manual operation unit 11 comes into contact with the luggage L1 and receives an operation input that is not intended by the user.

In this state, when the opening/closing information acquired by the opening/closing-information acquisition unit 13 shown in FIG. 1 indicates that the opening/closing part 22 is in a closed state, the control unit 12 disables the input to the manual operation unit 11 based on this opening/closing information. That is, it is possible to prevent the electronic apparatus 10 from malfunctioning due to accidental contact between the manual operation unit 11 and the luggage L1.

Specific Example of Input Locking Control Method 1

Figure 4:
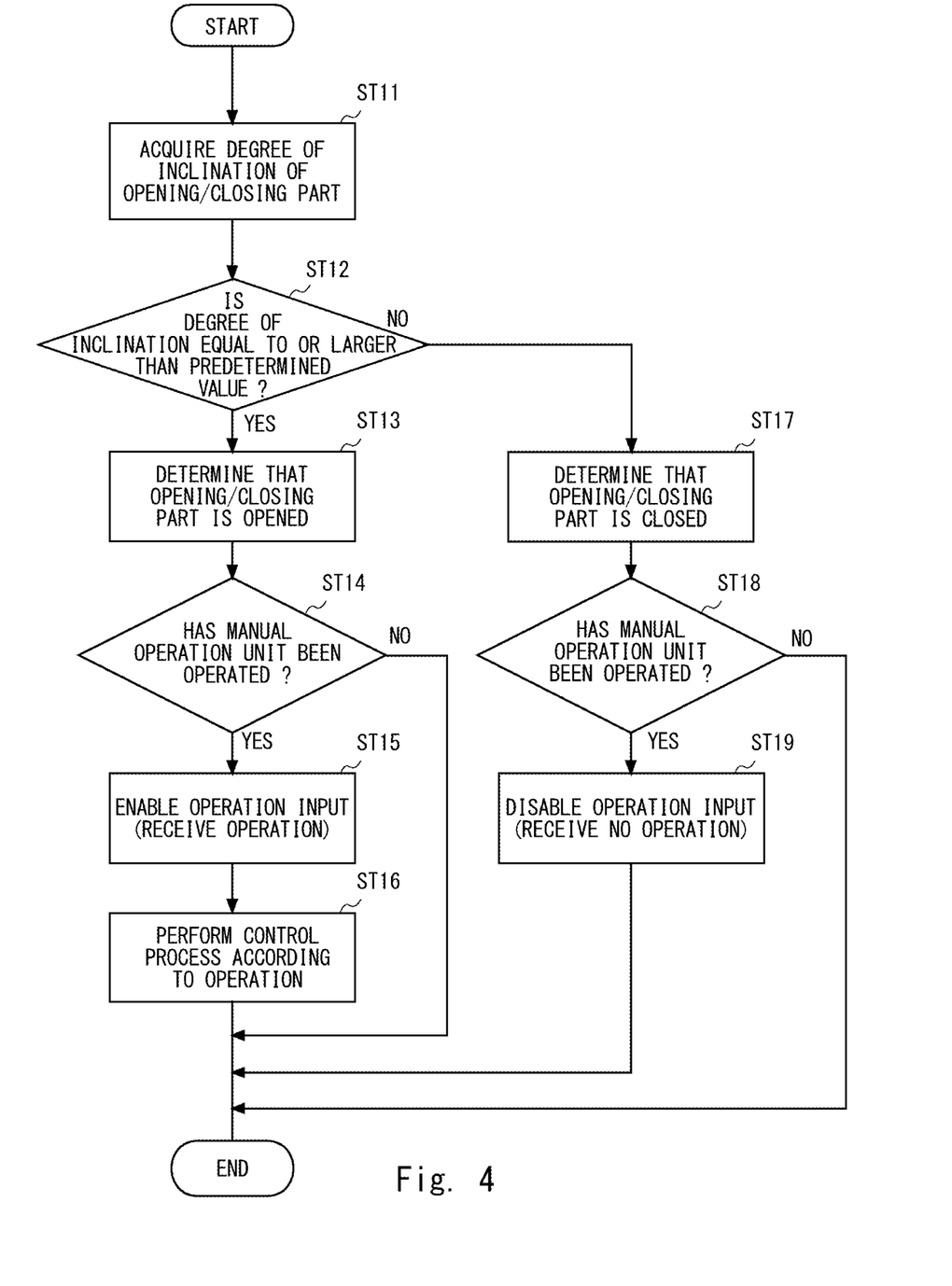
FIG. 4 is a flowchart showing operations in an example to which the electronic apparatus according to the first embodiment is applied.

Next, a specific example of the above-described input locking control method 1 will be described with reference to FIG. 4.

Firstly, the opening/closing-part inclination-level detection unit 14 detects inclination-level detection information indicating the degree of inclination of the opening/closing part 22 of the vehicle 20 with respect to the vehicle main-body 21, and the opening/closing-information acquisition unit 13 acquires this opening/closing-part inclination-level detection information (Inclination-level Acquisition Step ST11).

Next, it is determined whether or not the degree of inclination is equal to or larger than a predetermined value based on the acquired opening/closing-part inclination-level detection information (Opening/Closing Determination Step ST12). When the degree of inclination is equal to or larger than the predetermined value (Opening/Closing determination Step ST12: YES), it is determined that the opening/closing part 22 is in an opened state (Opening Determination Step ST13).

Next, it is determined whether or not the manual operation unit 11 has been operated (Operation Input Determination Step ST14). When it is determined that the manual operation unit 11 has been operated (Operation Input Determination Step ST14: YES), control is performed so that the input to the manual operation unit 11 is enabled (Operation Acceptance Step ST15). Further, the control unit 12 performs a control process according to the input that has been entered by the user and received by the manual operation unit 11 (Control Process Step ST16). That is, the user can operate the electronic apparatus 10.

Note that, in the opening/closing determination step ST12, when the degree of inclination is smaller than the predetermined value (Opening/Closing Determination Step ST12: NO), it is determined that the opening/closing part 22 is in a closed state (Closing Determination Step ST17).

Next, it is determined whether or not the manual operation unit 11 has been operated (Operation Input Determination Step ST18). When it is determined that the manual operation unit 11 has been operated (Operation Input Determination Step ST18: YES), control is performed so that the input to the manual operation unit 11 is disabled (Operation Acceptance Stop Step ST19). Therefore, the control unit 12 performs no control process according to the input received by the manual operation unit 11. That is, it is possible to prevent the electronic apparatus 10 from malfunctioning due to accidental contact between the manual operation unit 11 and the luggage L1.

Further, when it is determined that the manual operation unit 11 has not been operated in the operation input determination steps ST14 and ST18 (Steps ST14 and ST18: NO), it means that the manual operation unit 11 has not received any input and hence the electronic apparatus 10 has not been operated by the user. Therefore, no malfunction occurs.

By the above-described configuration, it is possible to detect inclination-level detection information indicating the degree of inclination of the opening/closing part 22 of the vehicle 20 with respect to the vehicle main-body 21 and to control the input locking of thereof.

(Input Locking Control Method 2)

Figure 5:
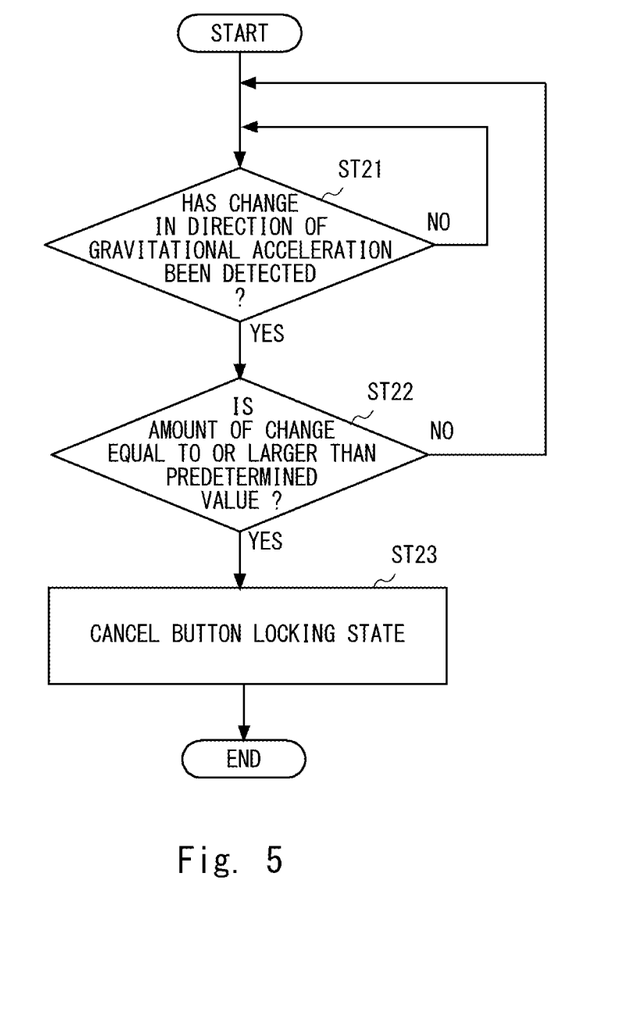
FIG. 5 is a flowchart showing operations in an example to which the electronic apparatus according to the first embodiment is applied.

Next, an example of the input locking control method according to the first embodiment will be described with reference to FIG. 5. FIG. 5 is a flowchart showing operations in an example to which the electronic apparatus according to the first embodiment is applied. Note that although the electronic apparatus 10 is used in this example of the input locking control method, other types of electronic apparatuses or a part of the configuration thereof may be used.

An example of the opening/closing-part inclination-level detection unit 14 of the electronic apparatus 10 described here is an acceleration sensor, which detects the direction of the gravitational acceleration applied to the electronic apparatus 10. Note that this acceleration sensor may also be referred to as an electronic-apparatus inclination-level detection unit. The acceleration sensor detects each of accelerations in xyz-directions in a three-dimensional space, and calculates the direction of the gravitational acceleration applied to the electronic apparatus 10 from the resultant vector of these detected accelerations. Further, in the example of the input locking control method shown in FIG. 5, the state where the tailgate, which is an example of the opening/closing part 22 (FIGS. 2 and 3), is in a closed state and the input by the buttons of the manual operation unit 11 is disabled is defined as a START point in the flowchart shown in FIG. 5.

Firstly, a change in the direction of the gravitational acceleration is detected (Gravitational Acceleration Direction Change Detection Step ST21). Specifically, the opening/closing-part inclination-level detection unit 14 acquires output values of the acceleration sensor, and calculates the amount of change in the gravitational acceleration from the output values of the acceleration sensor at intervals of a predetermined time.

When a change in the direction of the gravitational acceleration is detected (Gravity Acceleration Direction Change Detection Step ST21: YES), it is determined whether or not the calculated amount of change in the gravitational acceleration is equal to or larger than a threshold that is used to determine that the state of the above-described tailgate has changed from the closed state. (Tailgate Opening Change Determination Step ST22). Specifically, when the amount of change in the gravitational acceleration is equal to or larger than the predetermined threshold, it may be determined that the tailgate, which had been in the closed state, has been opened. More specifically, when the amount of change in the gravitational acceleration detected by the opening/closing-part inclination-level detection unit 14 is equal to or larger than the predetermined threshold, it may be determined that the state of the tailgate has been changed from the closed state. The predetermined threshold is, for example, a value for determining that the change in the acceleration is not within an error range, or a value indicating an arcuate movement of the opening/closing part on the two axes, i.e., in the front/rear direction and the up/down direction, i.e., a value indicating that the movement of the opening/closing part is different from those caused by the forward/backward movements of the vehicle 20 and those caused by vibrations thereof.

When it is determined that the state of the tailgate has changed from the closed state (Tailgate Opening Change Determination Step ST22: YES), the input by the buttons of the manual operation unit 11, which has been disabled, is enabled (Button Locking State Cancellation Step ST23).

Note that when no change in the direction of the gravitational acceleration is detected (Gravity Acceleration Direction Change Detection Step ST21: NO) or when it is not determined that the state of the tailgate has changed from the closed state (Tailgate Opening change Determination Step ST22: NO), the detection of the change in the direction of the gravitational acceleration is continued (Gravity Acceleration Direction Change Detection Step ST21).

As described above, it is determined that the above-described tailgate has been opened based on the change in the gravitational acceleration, and the input by the buttons of the manual operation unit 11 is enabled. When the above-described tailgate remains closed, the input by the buttons of the manual operation unit 11 of the electronic apparatus 10 remains in the disabled state, so that it is possible to prevent the electronic apparatus 10 from malfunctioning due to contact between the manual operation unit 11 and the luggage L1. Further, when the above-described tailgate is opened, the user can cancel the input by the buttons of the manual operation unit 11 of the electronic apparatus 10 without intentionally performing an operation for enabling the input locking state of the buttons of the manual operation unit 11. Therefore, the manual operation unit 11 can appropriately receive the input by the buttons of the manual operation unit 11. That is, it is possible to perform control so as to appropriately cancel the input locking state of the buttons of the manual operation unit 11 according to the opened/closed state of the tailgate.

Modified Example 1

Figure 6:
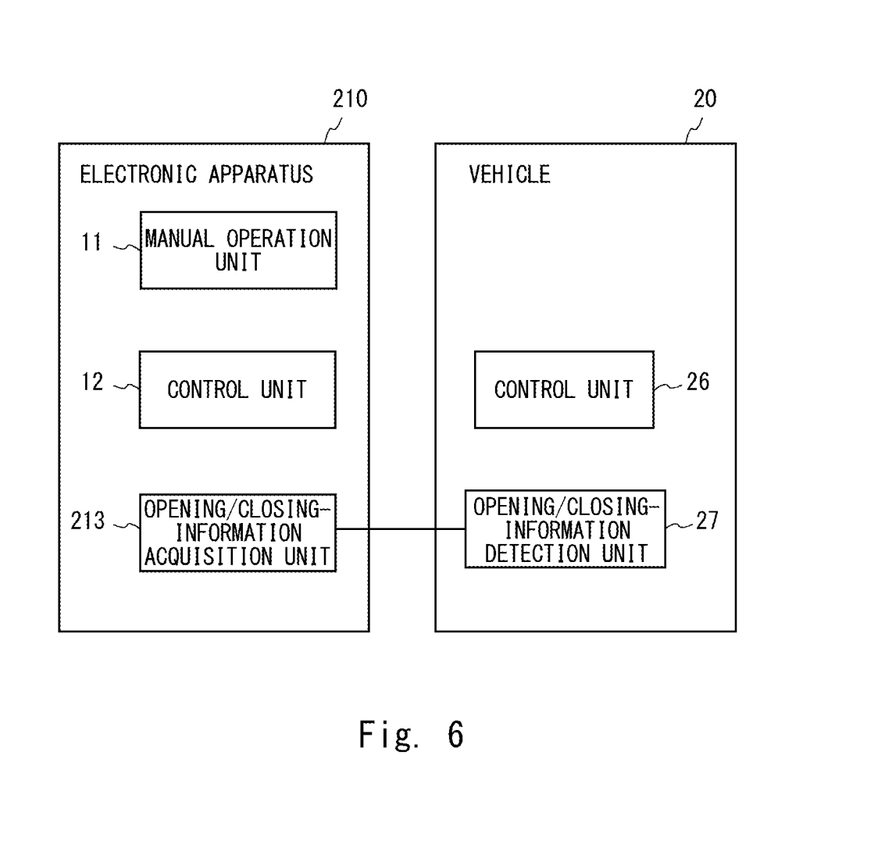
FIG. 6 is a block diagram showing a modified example of the electronic apparatus according to the first embodiment.

Next, an electronic apparatus 210, which is a modified example of the electronic apparatus 10 according to the first embodiment, will be described referring to FIG. 6. FIG. 6 is a block diagram showing a modified example of the electronic apparatus according to the first embodiment. The electronic apparatus 210 has a configuration different from that of the electronic apparatus 10 except for the manual operation unit 11 and the control unit 12. The configuration different from that of the electronic apparatus 10 will be described hereinafter.

As shown in FIG. 6, the electronic apparatus 210 includes an opening/closing-information acquisition unit 213. The opening/closing-information acquisition unit 213 acquires opening/closing information from an opening/closing-information detection unit 27 of the vehicle 20, or form opening/closing information by acquiring various types of detection information and performing a calculation process for the acquired detection information.

The opening/closing-information detection unit 27 detects opening/closing information or various types of detection information by which opening/closing information can be formed. Further, the opening/closing-information detection unit 27 may detect opening/closing information by acquiring, from the control unit 26, opening/closing control information indicating that the control unit 26 has instructed to open or close the opening/closing part 22. As the opening/closing-information detection unit 27, various sensors such as a rotary encoder and an acceleration sensor may be used.

As described above, according to the above-described configuration, since the electronic apparatus 210 acquires opening/closing information from the opening/closing-information detection unit 27 of the vehicle 20, there is no need to provide the opening/closing information detection unit in the electronic apparatus 210 itself. Therefore, the configuration of the electronic apparatus 210 is simpler than that of the electronic apparatus 10. Further, the electronic apparatus 210 can use opening/closing information containing the same contents as those contained in the opening/closing information acquired by the control unit 26 of the vehicle 20.

Modified Example 2

Figure 7:
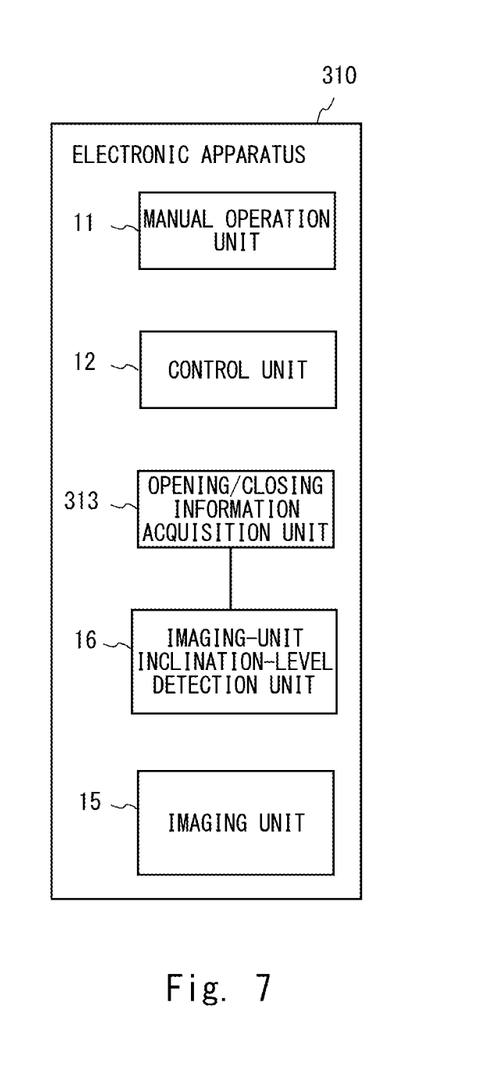
FIG. 7 is a block diagram showing another modified example of the electronic apparatus according to the first embodiment.

Next, an electronic apparatus 310, which is a modified example of the electronic apparatus 10, will be described referring to FIG. 7. FIG. 7 is a block diagram showing another modified example of the electronic apparatus according to the first embodiment. The electronic apparatus 310 has a configuration different from that of the electronic apparatus 10 except for the manual operation unit 11 and the control unit 12. The configuration different from that of the electronic apparatus 10 will be described hereinafter.

As shown in FIG. 7, the electronic apparatus 310 includes an opening/closing-information acquisition unit 313 and an imaging unit 15. The electronic apparatus 310 can be used as a dashboard camera.

The imaging unit 15 is, for example, a camera for a vehicle disposed in the opening/closing part 22 of the vehicle 20. Specifically, the imaging unit 15 is disposed on the luggage compartment 23 side of the transparent part 22a, which is a part of the opening/closing part 22 of the vehicle 20, and photographs (or films) the outside of the vehicle 20. Specifically, the imaging unit 15 is disposed in the tailgate of the vehicle 20 and can photograph (film) the area (i.e., the view) behind the vehicle 20. The imaging unit 15 includes an imaging device such as a CMOS (Complementary Metal-Oxide Semiconductor) sensor or a CCD (Charge Coupled Devices) sensor.

The electronic apparatus 310 includes, inside the opening/closing-information acquisition unit 313, an imaging-unit inclination-level detection unit 16. Specifically, the imaging-unit inclination-level detection unit 16 is, for example, an acceleration sensor, and detects the degree of inclination between the imaging unit disposed in the electronic apparatus 310 and the vertical direction or the traveling direction of the vehicle. In other words, the imaging-unit inclination-level detection unit 16 detects the degree of inclination of the imaging unit 15.

The opening/closing-information acquisition unit 313 acquires the degree of inclination of the imaging unit 15 from the imaging-unit inclination-level detection unit 16, and derives opening/closing information therefrom.

Specifically, when the imaging-unit inclination-level detection unit 16 detects an inclination of the imaging unit 15 equal to or larger than a predetermined threshold, the opening/closing-information acquisition unit 313 derives opening/closing information indicating that the opening/closing part 22 has been opened. When the imaging-unit inclination-level detection unit 16 detects no inclination of the imaging unit 15 equal to or larger than the predetermined threshold, the opening/closing-information acquisition unit 313 derives opening/closing information indicating that the opening/closing part 22 has been closed.

As described above, according to the above-described configuration, the electronic apparatus 310 derives opening/closing information based on the degree of inclination of the imaging unit 15 detected by the imaging-unit inclination-level detection unit 16. In the case where the electronic apparatus 310 is a dashboard camera, an imaging unit that is one of the components of the dashboard camera can be used as the imaging unit 15.

Modified Example 3

Figure 8:
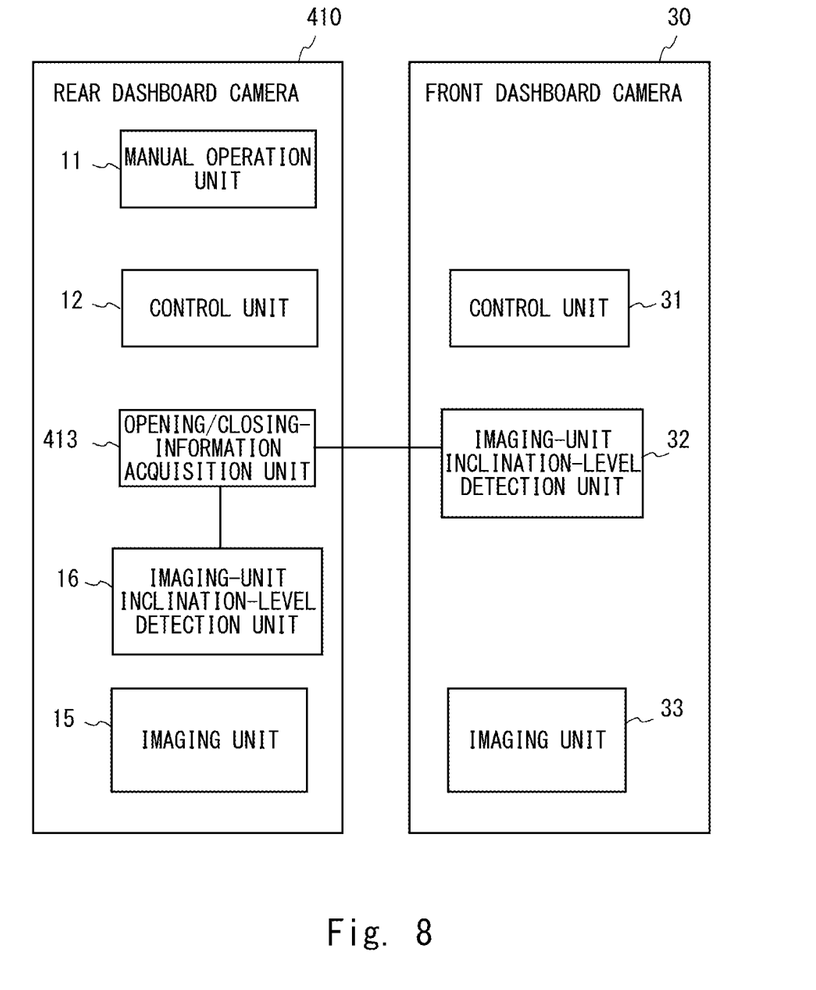
FIG. 8 is a block diagram showing another modified example of the electronic apparatus according to the first embodiment.

Next, a rear dashboard camera 410, which is a modified example of the electronic apparatus 10, will be described with reference to FIG. 8. FIG. 8 is a block diagram showing another modified example of the electronic apparatus according to the first embodiment. The electronic apparatus 410 has a configuration different from that of the electronic apparatus 10 except for the manual operation unit 11 and the control unit 12. The configuration different from that of the electronic apparatus 10 will be described hereinafter.

As shown in FIG. 8, the rear dashboard camera 410 includes an opening/closing-information acquisition unit 413 and an imaging-unit inclination-level detection unit 16. Similarly to the electronic apparatus 10 shown in FIGS. 2 and 3, the rear dashboard camera 410 is disposed on the luggage compartment 23 side of the transparent part 22a of the opening/closing part 22 of the vehicle 20.

The imaging-unit inclination-level detection unit 16 has a configuration similar to that of the opening/closing-part inclination-level detection unit 14. The imaging-unit inclination-level detection unit 16 detects inclination-level detection information indicating the degree of inclination of the imaging unit 15 with respect to the vehicle main-body 21. As the imaging-unit inclination-level detection unit 16, various sensors such as an acceleration sensor can be used. The acceleration sensor can detect changes in accelerations in three-dimensional xyz-axis directions. Specifically, the imaging-unit inclination-level detection unit 16 calculates and detects inclination-level detection information of the imaging unit 15 based on the changes in accelerations in the three-dimensional xyz-axis directions.

The vehicle 20 is equipped with a front dashboard camera 30. Specifically, the front dashboard camera 30 is disposed in or near the windshield of the vehicle 20. The front dashboard camera 30 includes a control unit 31, an imaging-unit inclination-level detection unit 32, and an imaging unit 33.

Similarly to the control unit 12, the control unit 31 is formed by a processor such as a CPU, and can have a function as a computer. The control unit 31 can perform various types of processing by executing a program(s) stored in a storage device (not shown). Further, by performing the program(s), the control unit 31 implements the functions of components for performing the necessary operations as the front dashboard camera 30.

The imaging-unit inclination-level detection unit 32 has a configuration similar to that of the imaging-unit inclination-level detection unit 16. The imaging-unit inclination-level detection unit 32 preferably uses the same type of an acceleration sensor as that used in the imaging-unit inclination-level detection unit 16. The imaging-unit inclination-level detection unit 32 detects the degree of inclination of the imaging unit 33 of the front dashboard camera 30. The degree of inclination of the imaging unit 33 is, for example, the degree of inclination of the imaging unit 33 with respect to the vehicle main-body 21. The imaging-unit inclination-level detection unit 32 may detect accelerations in three-dimensional directions of the front dashboard camera 30.

The opening/closing-information acquisition unit 413 acquires the degree of inclination of the imaging unit 30 of the front dashboard camera 33 through a wire or wirelessly. Further, the opening/closing-information acquisition unit 413 acquires the degree of inclination of the imaging unit 15 with respect to the vehicle main-body 21 through a wire or wirelessly. The opening/closing information acquisition part 413 obtains a difference between the acquired degree of inclination of the imaging unit 30 of the front dashboard camera 33 and that of the imaging unit 15 of the rear dashboard camera 410. When the obtained difference exceeds a predetermined value, the opening/closing-information acquisition unit 413 determines that the state of the opening/closing part 22 has changed from the closed state to an opened state. Note that the opening/closing-information acquisition unit 413 may acquire the accelerations in three-dimensional directions of the front dashboard camera 30 and those of the rear dashboard camera 410, and obtain a difference between them.

As described above, the rear dashboard camera 410 acquires opening/closing information based on the difference between the degree of inclination of the imaging unit 15 and that of the imaging unit 30 of the front dashboard camera 33. The rear dashboard camera 410 can determine the opened/closed state of the opening/closing part 22 while taking the degree of inclination of the front dashboard camera into consideration, so that it can improve the accuracy of the opening/closing information. Therefore, it is possible to improve the accuracy of the prevention of the malfunctioning of the electronic apparatus due to contact between luggage or the like carried inside the vehicle and the manual operation unit.

Note that the front dashboard camera 30 may be an electronic apparatus for other purposes as long as it is, for example, an electronic apparatus disposed in a part of the vehicle 20 other than the opening/closing part 22 thereof.

Other Embodiment Etc.

The function of each part of the electronic apparatus 10 shown in FIG. 1 has been described in the above-described embodiments, but the only requirement is that these functions should be implemented as the electronic apparatus 10. Note that although the above-described embodiments have been described on the assumption that the electronic apparatus 10 is installed in, as an example, the opening/closing part 22 or the like of the vehicle 20 as appropriate, the electronic apparatus 10 may be disposed in other parts as long as they are opening/closing parts that open and close with respect to the vehicle main-body 21. The place where the electronic apparatus 10 is installed is not limited to the vehicle. That is, the electronic apparatus 10 may be installed in an opening/closing part of a ship or a train, such as a door of a ship or a train.

Figure 9:
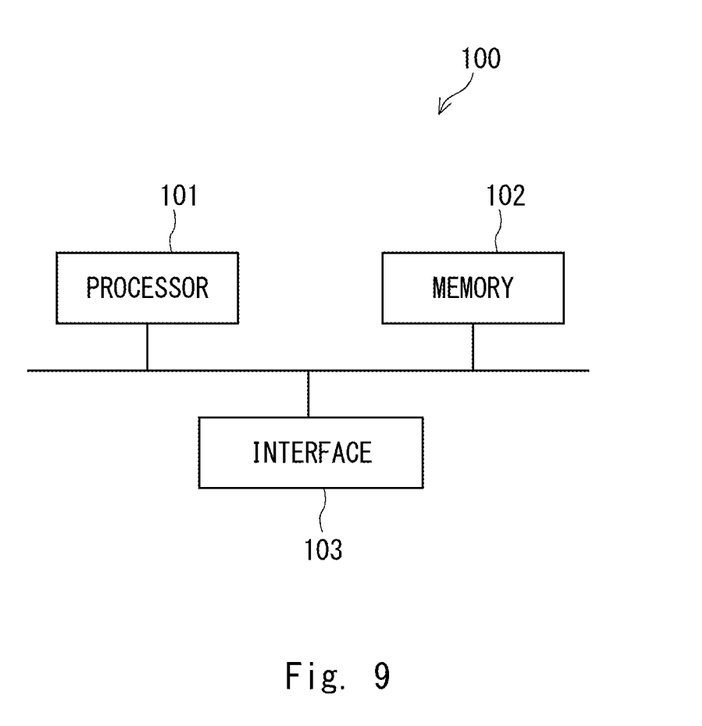
FIG. 9 shows an example of a hardware configuration included in an electronic apparatus.

Further, the electronic apparatus 10 according to the above-described embodiment may have the below-shown hardware configuration. FIG. 9 shows an example of a hardware configuration included in the electronic apparatus 10.

An electronic apparatus 100 shown in FIG. 9 includes a processor 101 and a memory 102 as well as an interface 103 for a manual operation unit 11. The control unit 12 and the opening/closing-information acquisition unit 13 described in the above-described embodiments are implemented as the processor 101 loads and executes a control program(s) stored in the memory 102. That is, the control program is a program for causing the processor 101 to function as the control unit 12 and the opening/closing-information acquisition unit 13 shown in FIG. 1, or a part thereof. It can be said that this control program is a program for causing the electronic apparatus 10 shown in FIG. 1 to perform the processing of the control unit 12 or a part thereof.

The above-described program can be stored and provided to a computer (a computer including an information notification apparatus) using any type of non-transitory computer readable media. Non-transitory computer readable media include any type of tangible storage media. Examples of non-transitory computer readable media include magnetic storage media (such as floppy disks, magnetic tapes, hard disk drives, etc.), and optical magnetic storage media (e.g., magneto-optical disks). Further, the examples include CD-ROM (Read Only Memory), CD-R, and CD-R/W. Further, the examples include semiconductor memories (such as mask ROM, PROM (programmable ROM), EPROM (erasable PROM), flash ROM, RAM (random access memory), etc.). Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, in the above-described various embodiments, the present disclosure may be implemented in the form of an input locking control method as described above as a series of processes performed in the electronic apparatus. The input locking control method includes first and second steps described below. The first step is a step of acquiring opening/closing information of an opening/closing part of a vehicle. The second step is a step of disabling an input received by a manual operation unit of the electronic apparatus when the acquired opening/closing information indicates that the opening/closing part is in a closed state. Note that other examples are the same as those described in the above-described various embodiments. Further, it can be said that the aforementioned control program is an input locking control program for causing an electronic apparatus to perform the above-described input locking control method.

Note that the present disclosure is not limited to the above-described example embodiments and can be modified as appropriate without departing from the spirit and scope of the present disclosure. Further, the present disclosure may be implemented by combining these example embodiments as desired.

According to the embodiment, it is possible to provide an electronic apparatus, an input locking control method, and an input locking control program capable of preventing the electronic apparatus from malfunctioning.

INDUSTRIAL APPLICABILITY

The present invention can be used, for example, in an electronic apparatus installed in a moving body such as a vehicle, its input locking control method, and its input locking control program.

What is claimed is:

1. An electronic apparatus installed in a moving body, comprising:
    an imaging unit disposed in an opening/closing part of the moving body;
    a manual operation unit configured to receive an input by pressing or contacting for operating the electronic apparatus, the manual operation unit being provided on a surface of a housing of the electronic apparatus;
    a control unit configured to perform control according to the input received by the manual operation unit; and
    an opening/closing-information acquisition unit configured to acquire opening/closing information of the opening/closing part of the moving body,
    wherein the opening/closing-information acquisition unit further comprises an electronic-apparatus inclination-level detection unit configured to detect a degree of inclination of the imaging unit,
    wherein the opening/closing-information acquisition unit determines whether or not the opening/closing part is in an opened state based on the degree of inclination of the imaging unit, and
    wherein, when the opening/closing information acquired by the opening/closing-information acquisition unit indicates that the opening/closing part is in a closed state, the control unit controls to an input locking state that disables the input by pressing or contacting, received by the manual operation unit.

2. The electronic apparatus according to claim 1, wherein the opening/closing-information acquisition unit further comprises an opening/closing-part inclination-level detection unit configured to detect a degree of inclination of the opening/closing part of the moving body, and
    the opening/closing-information acquisition unit determines whether or not the opening/closing part is in the closed state based on the degree of inclination of the opening/closing part.

3. An input locking control method for an electronic apparatus installed in a moving body, an imaging unit is disposed in an opening/closing part of the moving body, the input locking control method comprising:
    detecting a degree of inclination of the imaging unit;
    determining whether or not the opening/closing part is in an opened state based on the degree of inclination of the imaging unit;
    acquiring opening/closing information of the opening/closing part of the moving body; and
    controlling to an input locking state that disables an input received by a manual operation unit of the electronic apparatus, by pressing or contacting, when the acquired opening/closing information indicates that the opening/closing part is in a closed state.

4. A non-transitory computer-readable medium that stores an input locking control program for an electronic apparatus installed in a moving body, an imaging unit is disposed in an opening/closing part of the moving body, for causing the electronic apparatus to perform:
- detecting a degree of inclination of the imaging unit;
- determining whether or not the opening/closing part is in an opened state based on the degree of inclination of the imaging unit;
- acquiring opening/closing information of the opening/closing part of the moving body; and
- controlling to an input locking state that disables an input received by a manual operation unit of the electronic apparatus, by pressing or contacting, when the acquired opening/closing information indicates that the opening/closing part is in a closed state.

* * * * *